United States Patent
Smith et al.

(10) Patent No.: US 7,609,846 B2
(45) Date of Patent: Oct. 27, 2009

(54) MATCHING OF DIGITAL IMAGES TO ACQUISITION DEVICES

(75) Inventors: Craig M. Smith, Spencerport, NY (US); Robert V. Reisch, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 602 days.

(21) Appl. No.: 10/890,016

(22) Filed: Jul. 13, 2004

(65) Prior Publication Data

US 2006/0013434 A1  Jan. 19, 2006

(51) Int. Cl.
*G06K 9/00* (2006.01)

(52) U.S. Cl. .................. 382/100; 382/165; 382/167; 382/209; 348/223.1; 348/231.3; 348/231.6; 380/202

(58) Field of Classification Search ............... 382/209, 382/165, 167, 100; 348/223.1, 231.3, 231.6; 380/202
See application file for complete search history.

(56) References Cited

U.S. PATENT DOCUMENTS

| | | | |
|---|---|---|---|
| 5,499,294 A * | 3/1996 | Friedman | 713/179 |
| 5,748,307 A * | 5/1998 | Nakamura et al. | 348/222.1 |
| 5,901,245 A | 5/1999 | Warnick et al. | |
| 6,577,336 B2 * | 6/2003 | Safai | 348/207.1 |
| 6,654,048 B1 * | 11/2003 | Barrett-Lennard et al. | 348/180 |
| 6,675,174 B1 | 1/2004 | Bolle et al. | |
| 6,700,627 B2 | 3/2004 | Yang et al. | |
| 6,707,950 B1 | 3/2004 | Burns et al. | |
| 7,043,048 B1 * | 5/2006 | Ellingson | 382/100 |
| 7,216,232 B1 * | 5/2007 | Cox et al. | 713/176 |
| 2002/0083323 A1 | 6/2002 | Cromer et al. | |
| 2002/0191091 A1 * | 12/2002 | Raynor | 348/241 |
| 2003/0011684 A1 * | 1/2003 | Narayanaswami et al. | 348/231.3 |
| 2004/0095478 A1 * | 5/2004 | Takano et al. | 348/223.1 |
| 2004/0113052 A1 | 6/2004 | Johanneson et al. | |
| 2004/0264771 A1 * | 12/2004 | Sharma et al. | 382/165 |

FOREIGN PATENT DOCUMENTS

EP  0 483 391 A1  5/1992

OTHER PUBLICATIONS

"Distilling Noise Sources for Digital Capture Devices", Peter D. Burns and Don Williams, Eastman Kodak Company, Rochester, NY, USA, Proc. IS&T 2001, PICS Conference, p. 132-136, 2001.

"CCD Fingerprint Method—Identification of a Video Camera From Videotaped Images", Kenji Kurosawa, Kenro Kuroki, Naoki Saitoh, Physics Section, National Research Institute of Police Science, Japan, 0-7803-5467-2/99/$ 10.00 @ 1999 IEEE pp. 537-540.

(Continued)

*Primary Examiner*—Vikkram Bali
*Assistant Examiner*—Daniel Zeilberger
(74) *Attorney, Agent, or Firm*—Robert L. Walker

(57) ABSTRACT

In a digital image matching method, reference calibration data associated with one or more reference digital image files is ascertained. The reference digital image files each have reference calibration data that is hidden metadata and can also have public metadata that is readable by a different procedure. A test digital image file is obtained and a data structure capable of holding the reference calibration data is detected in the test digital image file. The presence of second calibration data within the data structure of the test digital image file is determined. If the reference and second calibration data match, then the test digital image file and reference digital image files are from the same digital acquisition device.

2 Claims, 12 Drawing Sheets

OTHER PUBLICATIONS

"Methods of Identification of Images Acquired With Digital Cameras", Zeno J. Geradis(a), Jurrien Bijhold(a), Martijn Kieft(a), Kenji Kurosawa(b), Kenro Kuroki(b), Naoki Saitoh(b), (a) Netherlands Forensic Institute, Volmerlaan 17, 2288 GD Rijswijk, Netherlands (b) National Research Institute of Police Science, 6-3-1 Kashiwanoha, Kashiwa, Chiba 277-0882, Japan, Enabling Technologies for Law Enforcement and Security, Simon K. Bramble, Edward M. Carapezza, Leonid I. Rudin, Editors, Proceedings of SPIE vol. 4232 (2001) @ 2001 SPIE—0277-786X/01/$15.00.

"Identification of Image Noise Sources in Digital Scanner Evaluation", Peter D. Burns, and Donald Williams, Eastman Kodak Company, Rochester, NY USA 14650-1925, Proc. SPIE-IS&T Electronics Imaging Symposium, SPIE vol. 5294, p. 114-123, 2004.

* cited by examiner

MATCHING OF DIGITAL IMAGES TO ACQUISITION DEVICES

CROSS REFERENCE TO RELATED APPLICATIONS

Reference is made to commonly assigned, co-pending U.S. patent application Ser. No. 10/890,012, entitled: IDENTIFICATION OF ACQUISITION DEVICES FROM DIGITAL IMAGES, filed Jul. 13, 2004, in the names of Peter D. Burns, Donald R. Williams, Craig M. Smith, Robert V. Reisch; which is hereby incorporated herein by reference.

FIELD OF THE INVENTION

The invention relates to digital image processing and analysis and more particularly relates to the identification of image acquisition devices, such as digital still and video cameras and scanners, for forensic investigations and other purposes.

BACKGROUND OF THE INVENTION

Metadata has been used in digital image files for a variety of purposes, including identifying the model and serial number of the digital camera that captured the associated image. This information is incorporated in numerous image file standards along with detailed features of the particular metadata with the respective image files. This is generally very useful. A shortcoming is that this metadata is relatively easy for a person of moderate skill to deliberately change so as to create a false trail for any later forensic investigation of the source of captured images.

It would thus be desirable to provide improved identification of digital image acquisition devices, which eliminates or reduces these shortcomings.

SUMMARY OF THE INVENTION

The invention is defined by the claims. The invention, in broader aspects, provides a digital image matching method, in which reference calibration data associated with one or more reference digital image files is ascertained. The reference digital image files each have reference calibration data that is hidden metadata and can also have public metadata that is readable by a different procedure. A test digital image file is obtained and a data structure capable of holding the reference calibration data is detected in the test digital image file. The presence of second calibration data within the data structure of the test digital image file is determined. If the reference and second calibration data match, then the test digital image file and reference digital image files are from the same digital acquisition device.

It is an advantageous effect of the invention that an improved identification of digital image acquisition devices, which considers calibration data hidden in image files.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
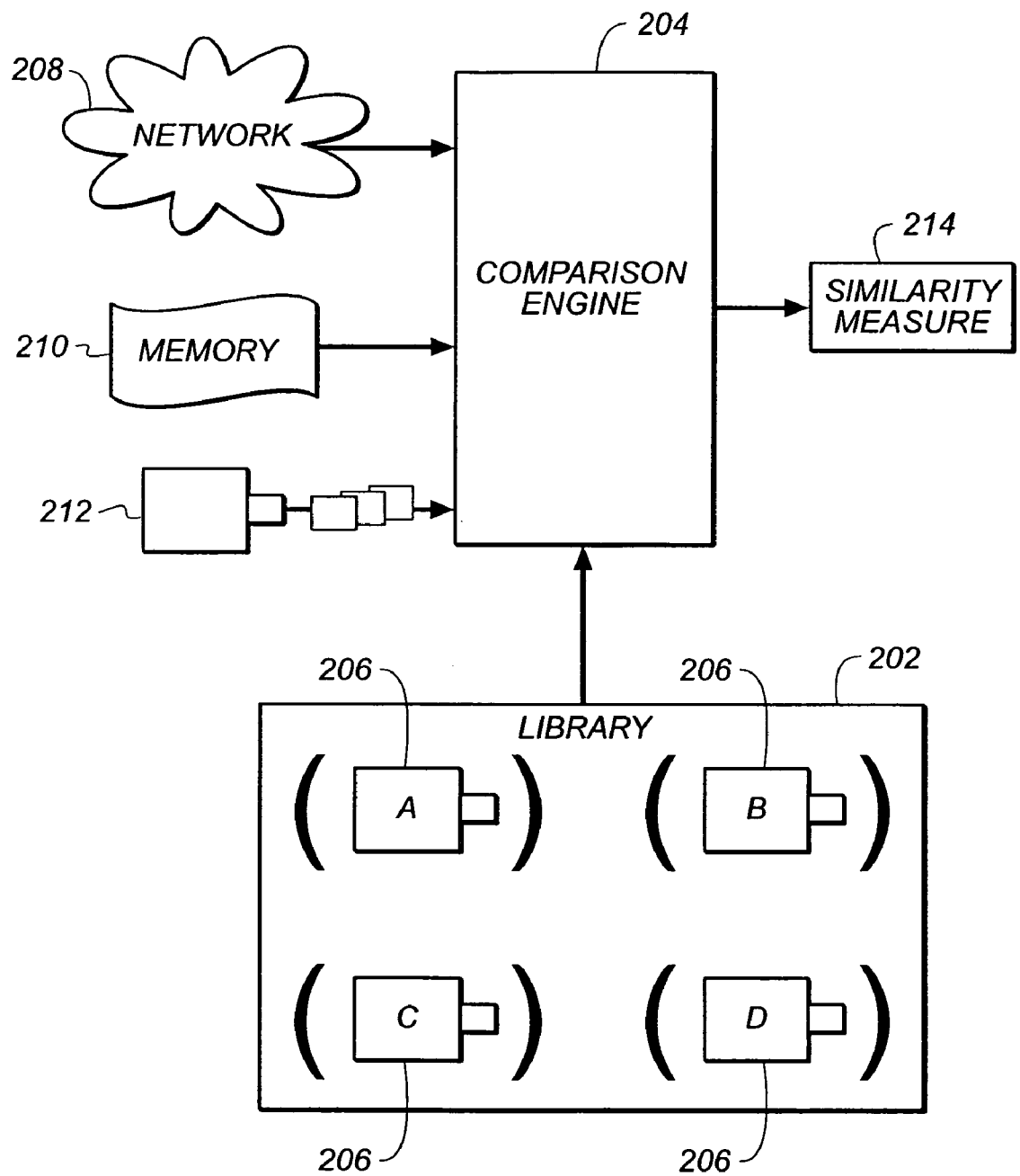
FIG. 1 is a diagrammatical view of an embodiment of the system.

In the following description, some embodiments of the present invention will be described, in which features are provided by software programs. Those skilled in the art will readily recognize that the equivalent of such software may also be constructed in hardware. Because image manipulation algorithms are well known, the present description will be directed in particular to algorithms and system features relating to the algorithms. Other aspects of such algorithms, apparatus, and systems and hardware and/or software for producing and otherwise processing the image signals and other signals involved herein can be selected from such systems, algorithms, components, and elements known in the art. Given the description as set forth in the following specification, all software implementation thereof is conventional and within the ordinary skill in such arts.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For convenience, these signals as sometimes referred to herein in relation to the underlying information using referents such as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "calculating" or "determining" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

The present invention also relates to systems including specific pieces of apparatus for performing the operations described herein. Apparatus such as a programmable computer can be specially constructed for the required purposes, or may comprise a general purpose computer selectively activated or reconfigured by a computer program stored in the computer.

The algorithms presented herein are not inherently related to any particular computer or other apparatus. Various general purpose systems can be used with programs in accordance with the teachings herein, or it may prove convenient to construct more specialized apparatus to perform the methods. The structure for a variety of these systems will appear from the description below. In addition, the present invention is not described with reference to any particular programming language. It will be appreciated that a variety of programming languages can be used to implement the teachings of the invention as described herein.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

Elements not specifically shown or described herein can be selected from those known in the art. Certain aspects of the embodiment to be described can be provided in software. Given the methods and systems as shown and described herein, software not specifically shown, described or suggested herein that is useful for implementation of the invention is conventional and within the ordinary skill in such arts. It will be understood that the system and method may embody algorithms and processes not specifically shown or described herein that are useful for implementation. Such algorithms and processes are conventional and within the ordinary skill in such arts.

The computer program for performing the method of the present invention can be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of a local or remote network or other communication medium. Those skilled in the art will readily recognize that the equivalent of such a computer program product may also be constructed in hardware or firmware known as application specific integrated circuits (ASICs). An ASIC can be designed on a single silicon chip to perform the method of the present invention. The ASIC can include the circuits to perform the logic, microprocessors, and memory necessary to perform the method of the present invention. Multiple ASICs can be envisioned and employed as well for the present invention.

A computer or machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The present invention can be employed in a variety of user contexts and environments. Exemplary contexts and environments include, without limitation, systems using portable and/or non-portable components and/or components provided via a local or remote network, such as the Internet or a cellular or publicly switched telephone network. Test and reference image acquisition devices can be directly connected or can provide images through portable or non-portable storage media or via a network.

In each case, the invention may stand alone or can be a component of a larger system solution. Furthermore, human interfaces, the display to a user (if needed), the input of user requests or processing instructions (if needed), the output, can each be on the same or different devices and physical locations, and communication between the devices and locations can be via public or private network connections, or media based communication. Where consistent with the disclosure of the invention, the methods can be fully automatic, may have user input (be fully or partially manual), may have user or operator review to accept/reject the result, or can be assisted by metadata (metadata that can be user supplied or supplied automatically). Moreover, the algorithm(s) may interface with a variety of workflow user interface schemes.

Figure 2:
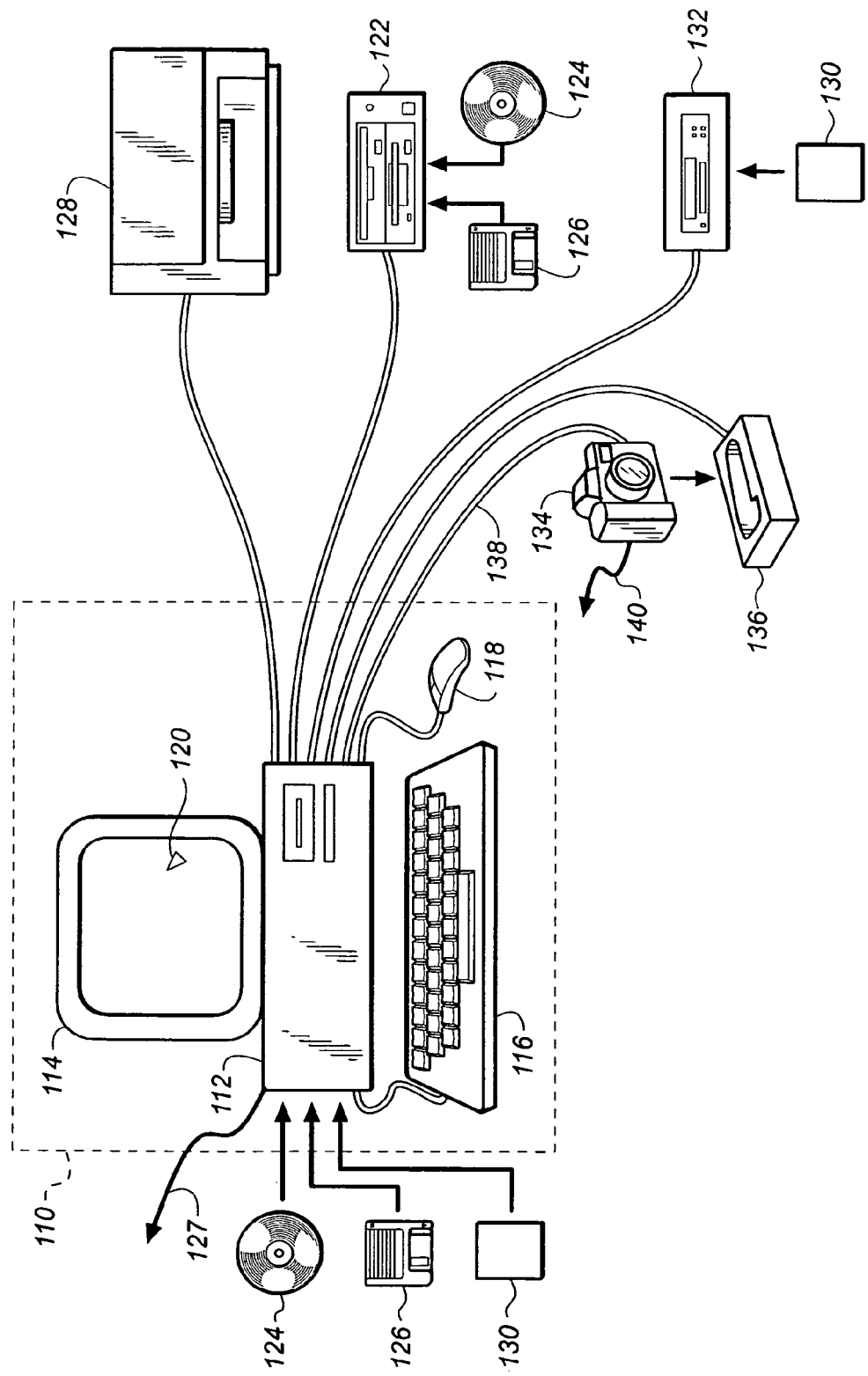
FIG. 2 is a semi-diagrammatical view of another embodiment of the system.

The present invention can be implemented in computer hardware. Referring to FIG. 2, there is illustrated a computer system 110, which includes a microprocessor-based unit 112 for receiving and processing software programs and for performing other processing functions. The microprocessor-based unit 112 can be programmed, as is well known in the art, for storing the software program internally. A display 114 is electrically connected to the microprocessor-based unit 112 for displaying user-related information associated with the software, for example, by means of a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disc (such as a CD-ROM, CD-R, or CD-RW disc) 124 can be inserted into the microprocessor based unit or a connected input device 122 for inputting the software programs and digital images to the microprocessor based unit 112. A floppy disk 126 or other portable memory 130 can be used in the same manner. The microprocessor-based unit 112 can also have a network connection 127, such as a telephone line, to an external network, such as a local area network or the Internet. A printer 128 can also be connected to the microprocessor-based unit 112 for printing hardcopy output from the computer system 110.

Images and videos can also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is inserted into the microprocessor based unit 112 or an externally located PC card reader 132 connected to the microprocessor-based unit 112. Images can be input via the compact disk 124, the floppy disk 126, or other portable media or through the network connection 127. Images can be input through a direct connection to a digital image acquisition device 134 (illustrated as a camera) or via a suitable dock or other connection device 136 or via a wireless connection 140 to the microprocessor-based unit 112.

The method and system provide an identification of a test digital image as having a particular probability of being from the same digital image acquisition device as one or more reference images. This result can be used directly, as forensic evidence or the like, or as an aid for human inspection or other further automated analysis.

Fixed pattern noise fluctuations are introduced during image acquisition and are unique or near-unique to an individual image acquisition device. The term fixed pattern noise fluctuations refers to non-uniformities that at least partially repeat in all or a set of images generated by a digital acquisition device, such as a scanner or digital camera. For example if there is a pixel-to-pixel variation in the sensitivity of a camera sensor, this can introduce a repeated pattern into many if not all images from that camera. Identification is accomplished via a statistical comparison of values of a parameter from a reference fixed-pattern array and from a grid of pixel values from a test digital image. The statistical comparison does not simply compare locations and variations of individual values, but rather compares the array and grid in two or more dimensions, preferably using a neighborhood operator and thousands of pixel values.

For convenience, the invention is generally discussed herein in relation to two-dimensional test and reference images captured using visible light. The images can be n-dimensional, where n is 2 or greater, and can use other modalities than visible light, such as infrared and ultraviolet bands of the electromagnetic spectrum.

A digital image includes one or more digital image channels or color components. Each digital image channel is a two-dimensional array of pixels. Each pixel value relates to the amount of light received by the imaging capture device at the physical region of the pixel. For color imaging applications, a digital image will often consist of red, green, and blue digital image channels. Motion imaging applications can be considered a sequence of digital images and can be processed as individual images or by processing a first image in a particular sequence and estimating changes necessary for succeeding images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non-rectilinear arrays with equal effect.

FIG. 1 illustrates, functional components of the system. It will be understood that implementation of the system in hardware and software can be like the embodiment shown in FIG. 2 and the implementation may variously divide or combine different functionalities here discussed. In FIG. 1, the identification system 200 has a library 202 that is operatively connected to a comparison engine 204. The library 202 stores reference models 206 (shown as cameras enclosed by parentheses) of fixed pattern noise of a plurality of different reference image acquisition devices. Each of the reference models has one or more arrays (not shown) relating to fixed pattern noise of the respective reference image acquisition device. Within a reference model, the different arrays can provide values for different parameters or for the same parameter at different acquisition conditions or both.

The comparison engine 204 receives the test digital image from an outside source, such as a network 208, a digital image in memory 210, or stream of images from a test camera 212.

The comparison engine 204 determines values of a test parameter at a grid of locations in a region of the test digital image and calculates the similarity measure. This can be repeated for other parameters. Results as one or more individual similarity measures or as a combined measure are presented by output 214, in the form of hard copy output or a display image or the like.

Figure 3:
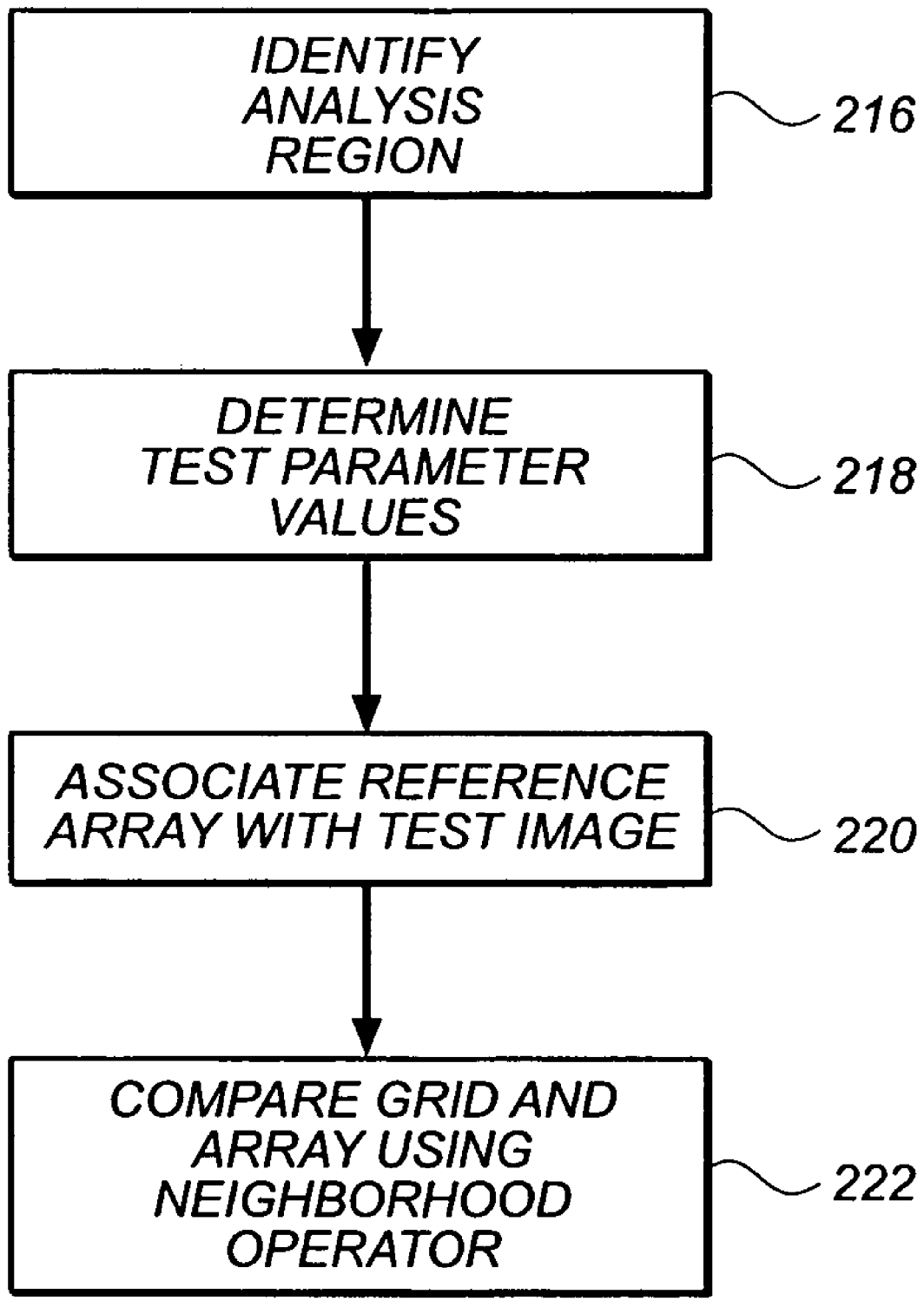
FIG. 3 is a flow chart of an embodiment of the method.

Referring now to FIG. 3, in an embodiment of the method, an analysis region is identified (216) in a test digital image. Values of a test parameter at a grid of locations in the analysis region are determined (218). A reference model and a reference array (also referred to herein as a fixed pattern noise array), in the reference model, of values of the test parameter for fixed pattern noise of a reference image acquisition device are associated (220) with the test digital image. The grid and array are then statistically compared using a two or more dimensional similarity measure.

The reference array is selected so as to have the same test parameter as the grid and, if applicable, can be selected to also have other similarities. For example, in some cases, the reference array can be selected so as to have the same signal level as the grid. Since selection is a simple matching of a known test parameter and, optionally, of an easily determined condition, selection can be automatically provided by software or can be provided manually, for example, by a user selecting reference arrays using the test parameter from a list of all of the reference arrays.

The reference model is based upon one or more reference images from a particular acquisition device. The reference images are captured, registered pixel-to-pixel, and used to generate the reference arrays of the reference model. These reference images can be captured and used to generate the reference model at the time of testing. This is a practical approach, if a particular acquisition device and test image or images were obtained independently, and the comparison is to determine a likelihood of whether or not the test image or images came from the particular acquisition device. For example, the test image or images can be obtained first, followed by later obtaining one or more acquisition devices for comparison to the test image or images.

The reference model can also be obtained from an earlier prepared reference model database. The database can be based upon reference images captured at the time of manufacture of the acquisition device or at a later time. This approach can be used to identify test images with a particular image acquisition device without needing contemporaneous access to the device itself. Alternatively, if the identity of an acquisition device, rather than images, is at issue, then test images can be captured under controlled conditions, at the time of testing, for comparison to the reference model.

A reference model can also be prepared from an image or images captured on an unknown image acquisition device. In this case, the comparison is an indication of whether or not the test image or images came from the same acquisition device as the reference image or images.

In the method, the sources of test images and reference images can be reversed. For example, unidentified images can be used to prepare a reference model and images captured using an available acquisition device can be used as test images. This approach may be less desirable, depending upon the nature of the available images. For convenience, the invention is generally discussed herein in relation to embodiments, in which the reference images are prepared using controlled conditions, such as uniform fields, and the test images are otherwise obtained and have variable scene content, that is, image information that varies at different locations in the image. Those of skill in the art will understand that like considerations apply to other embodiments, taking into account applicable differences between test and reference images.

Figure 4:
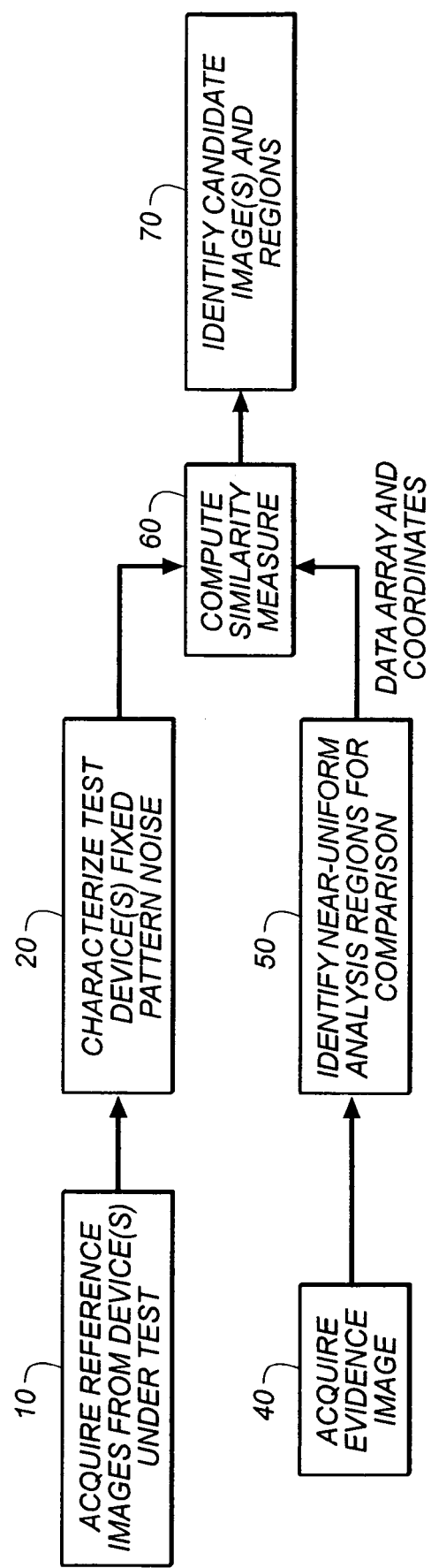
FIG. 4 is a flow chart of another embodiment of the method.

Referring now to FIG. 4, in this embodiment of the method a particular camera or other acquisition device is available and the method is directed to determining whether an independently acquired test image was or was not produced using that particular device. This embodiment of the method has the steps:

acquiring (10) reference images from an acquisition device under test, characterizing (20) the fixed pattern noise to generate a fixed pattern noise array for a selected test parameter.

acquiring (40) one or more test digital images, in order to determine whether or not the test image or images came from the particular acquisition device under test, identification (50) of a near-uniform analysis region in each test image and generation of values for the test parameter at a grid of locations in the analysis region, computing (60) a similarity measure for the grid and a corresponding portion (subarray) of the array, identification (70) of each candidate image from the set of test images which is indicated as matching the reference camera, based on the similarity measure.

In the acquiring step, each device under test is used to capture one or more reference images. The conditions of capture can be matched to the conditions used to create the test images, within practical limits. For example, signal level (shutter speed/acquisition time and aperture) can be matched in a test camera that was earlier used to produce a reference model. The same target or a comparable target can be used for image capture. In other situations, the conditions of capture are unknown, but can be determined to be within particular ranges by examination of the test image, such that the conditions of capture can be imitated. Reference images can be captured for every set of conditions using a target matched to scene content. This is robust, but results in a large number of comparisons and is computationally demanding. A simpler approach is use of a single uniform image field at a single, lighted signal level. This approach is less demanding, but less robust.

Figure 5:
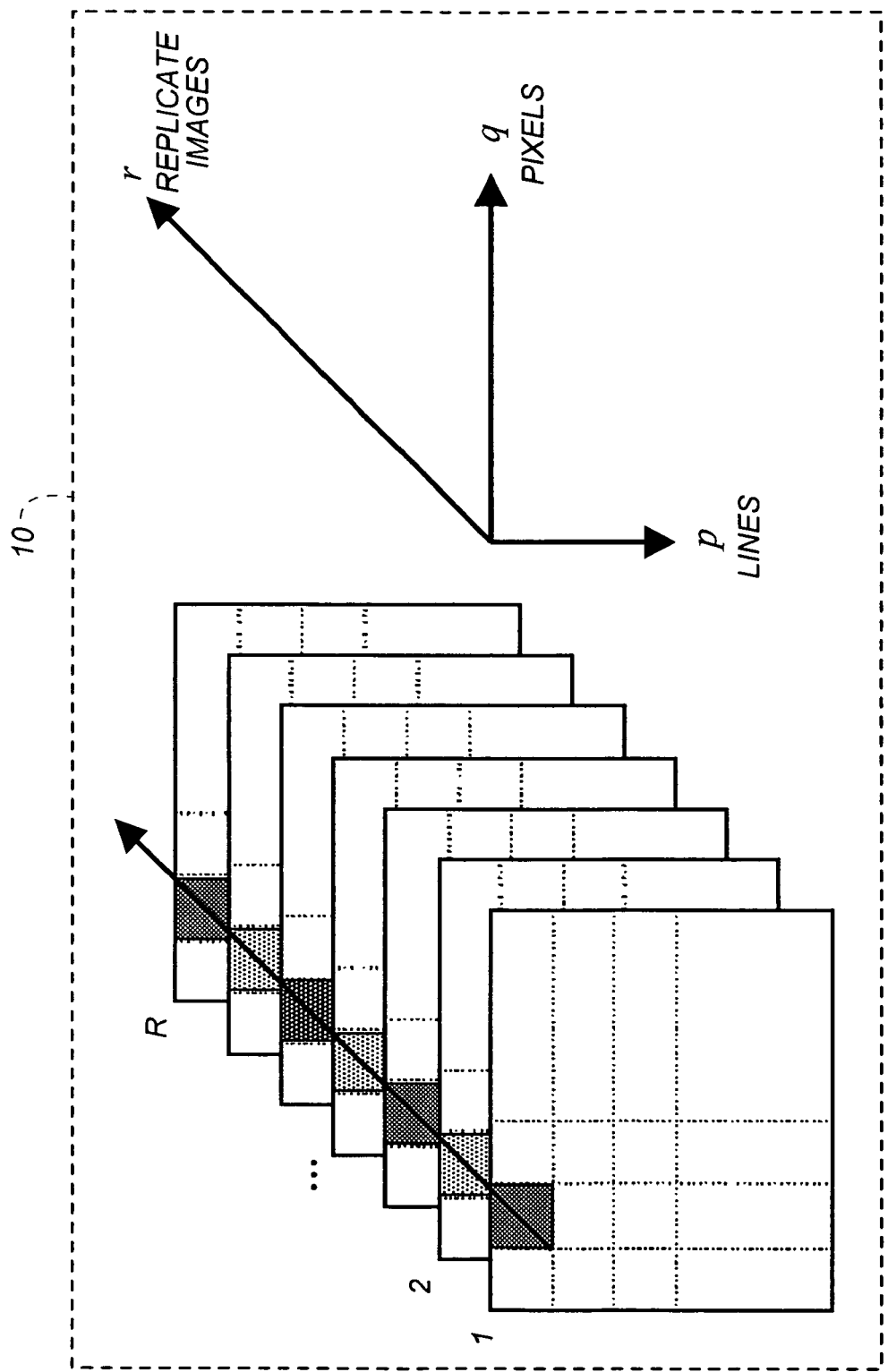
FIG. 5 is a diagrammatical view of the acquiring of reference images in the method of FIG. 4.

An intermediate approach, which is discussed in more detail herein, is use of uniform (gray) image fields at a range of signal levels from dark (no light) to a lighted level. For each of signal level, a series of replicate images is acquired (10) as illustrated in FIG. 5. A number, R, of replicate digital images are captured using several, T, gray test targets. The number of replicates is generally discussed herein as a number greater than one, but R can be equal to one.

The fixed pattern noise of the reference acquisition device is next characterized to provide one or more fixed pattern noise arrays. Separate arrays can be provided for different test parameters. Suitable parameters provide useful information on the image under consideration. Examples include average intensity values and intensity statistics, such as variances, and spatial and color correlation statistics.

The data set of test parameter values can be expressed as a data array denoted $d_{pqr}$, where p=1, ..., P lines, q=1, ..., Q pixels, r=1, ..., R replicates. FIG. 5 shows the sampling used.

A fixed pattern noise array is computed from the set of images by inter-record averaging of the R registered digital images, $d_{pqr}$. This results in an estimate of the fixed pattern array, $$fp_{pq} = \frac{1}{R}\sum_{r=1}^{R} d_{pqr}, \quad (1)$$

for each color record (e.g., red, green and blue) in the digital image. This is done in FIG. 6A, step 24 of block 20.

The fixed pattern noise array is a mathematical description of how the fixed pattern noise of the image acquisition device is combined with the scene or scanned print image information. For example, if the fixed pattern noise array, $fp_{pq}$, is taken as an effective pixel-to-pixel gain array, then the stored image pixel values are given by, $$d_{pq} = fp_{pq} s_{pq}$$

where $s_{pq}$ is the array of image pixel values without fixed pattern noise. In this case the device fixed pattern array is the array of pixel values corresponding the to the pixel-by-pixel average of several nominally uniform exposures (camera) or uniform test target (scanner). (The average here is the arithmetic mean. The median and mode could also be used to provide other arrays.)

The array of values fp, is stored for later use in digital scanner or camera identification. This is done in FIG. 6A, step 26 of block 20.

Each fixed pattern noise array is stored as a logical part of a reference model for the respective acquisition device. The reference model can be limited to a single array or can have multiple arrays. For example, in a particular embodiment, the reference model has a series of arrays, with each one corresponding to a different average neutral signal level. In this case, $$fp_{pqt} = \overline{x}_{pqt}$$

where t is the average (mean) image signal (e.g. 10, 20, ..., 255).

The next step in comparing the test image noise characteristics with those of the reference images is the selection of part of the test image as the analysis region. The analysis region can be limited to a single contiguous area or can have multiple areas. Using conventional terminology, in the latter case, a test image can be sparsely populated by an analysis region. In either case, each area has multiple contiguous pixels.

The analysis region has a more uniform signal level than the test image overall and, preferably, has a more uniform signal level than the remainder of the test image. More preferably, the near-uniform region has a signal level that is more uniform than any other area of the same size in the test image.

Figure 7:
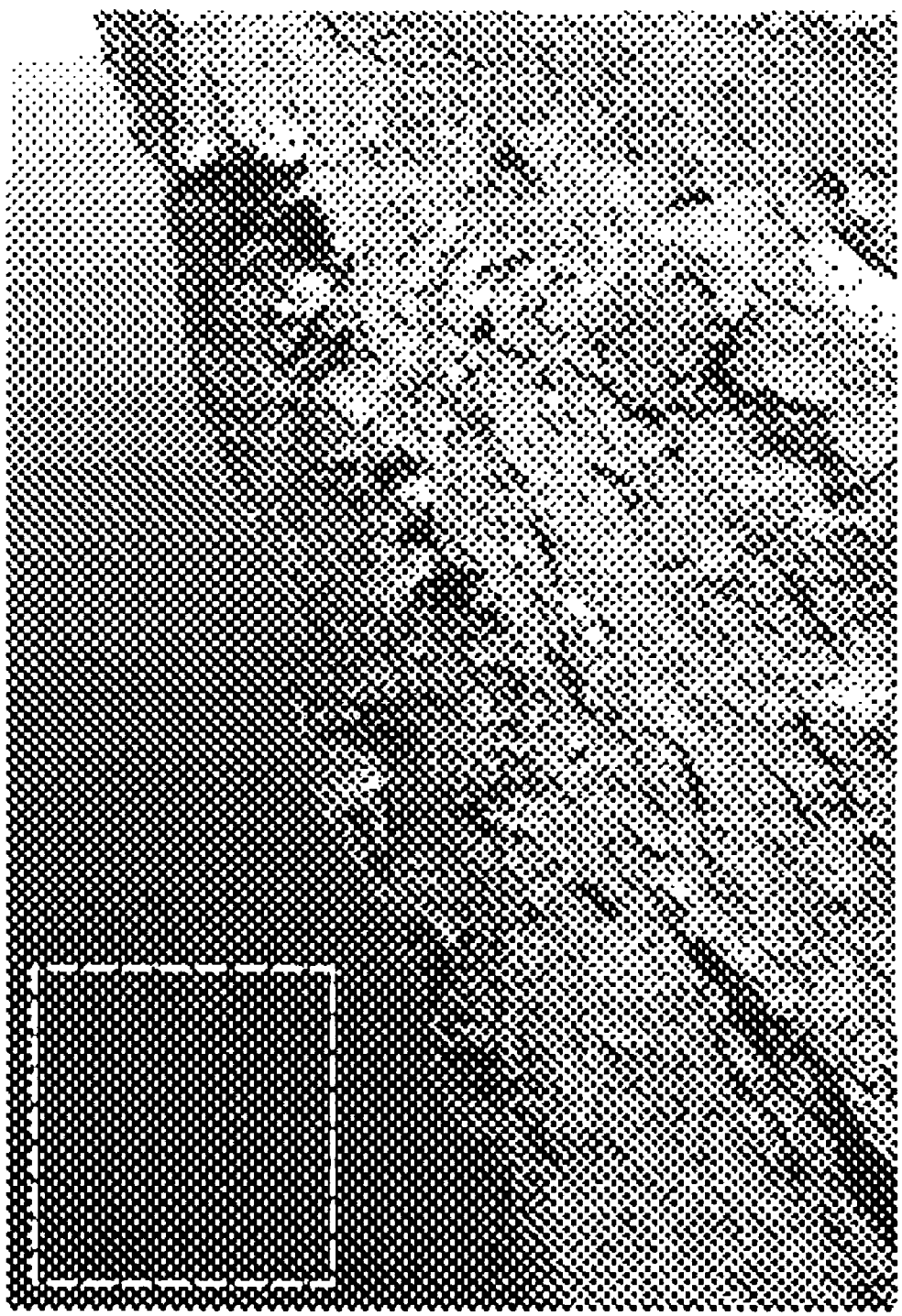
FIG. 7 is an example of a test digital image showing the selecting of an analysis region with a dashed line rectangle.
Figure 8:
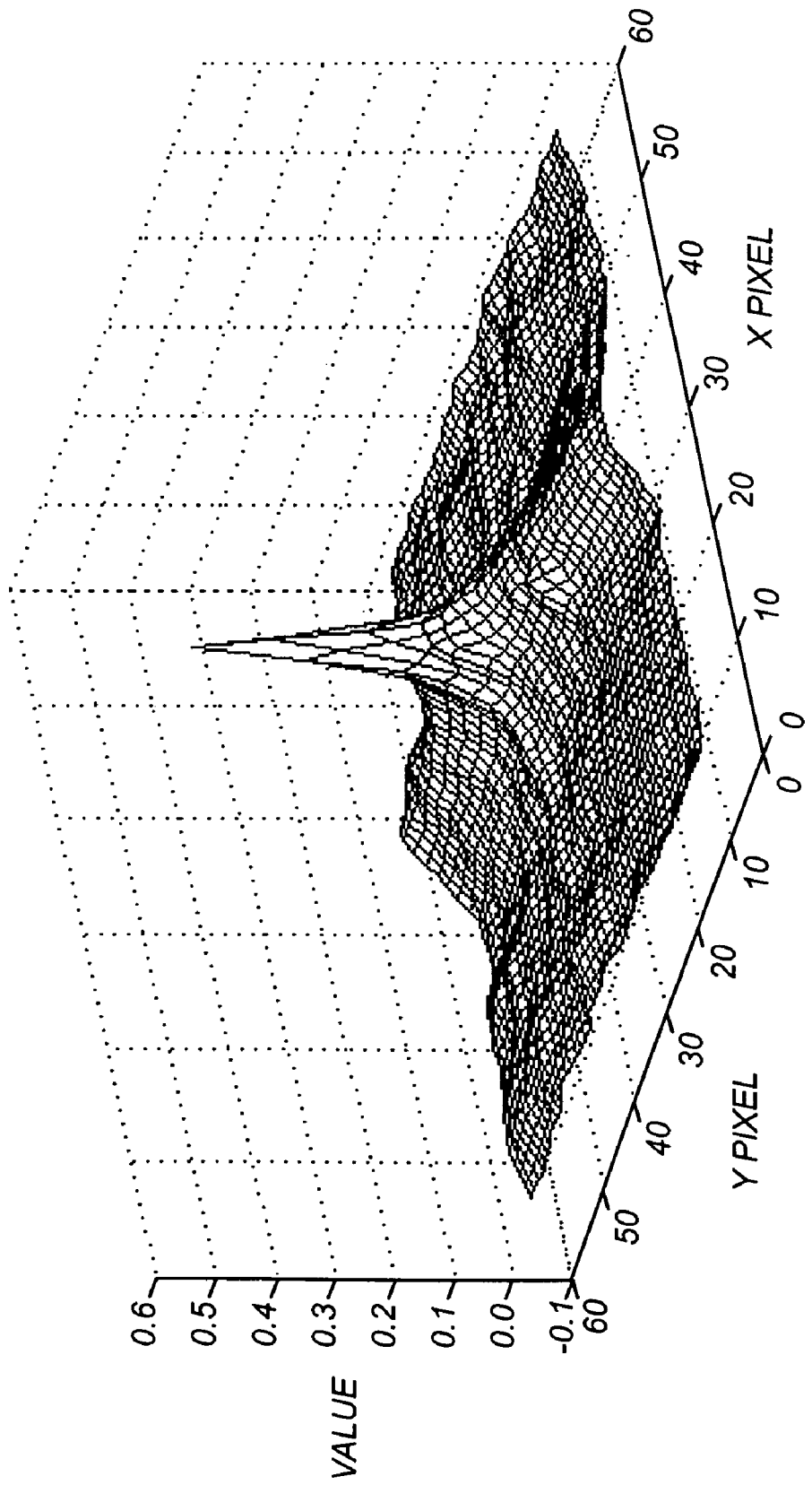
FIG. 8 is a graph of an example of a similarity measure using a cross-correlation as a neighborhood operator.

The near-uniform area can be selected manually or automatically. In an example of manual selection, the test image is presented on a display of the computer system and a user outlines or otherwise designates the analysis area with a input device, such as a computer mouse. The user decides upon an appropriate area by comparing detailed features visible in different parts of the test image. In many cases, a suitable near-uniform area is part of the sky, as shown in FIG. 7. Provision can be made to ensure that the user outlines an analysis region that is not excessively small.

Automatic selection can be provided in a variety of ways, such as the use of an image segmentation algorithm, following automatic identification of near-uniform image areas, as disclosed in U.S. Pat. No. 5,901,245, which is hereby incorporated herein by reference. Automatic and manual methods can be combined, such that an area is suggested automatically and is then confirmed by the user.

Image clean-up can be provided to reduce non-uniformity in the analysis region. For example, removal of shading or long term trends in the selected analysis region can be provided. This can be done by the statistical fitting (62 in FIG. 6B) of each two-dimensional array with a plane, or polynomial function, for example:

$$g_{pq} = a + bp + cq + dpq$$

where p and q are the pixel coordinates for the data in the analysis region the line and pixel directions, and where a,b,c,d are constants. This plane function is subtracted from the selected analysis region, $$e_{pq} = h_{pq} - g_{pq}, \quad (2)$$

where h is the data array for the analysis region and e is the modified analysis region. This is done in step 64 of FIG. 6B. Alternatively, the analysis region can be divided, pixel-by-pixel, by the two-dimensional fit equation, $g_{pq}$.

After clean-up, values of the test parameter are calculated at a grid of points in the analysis region. The resulting grid of values are compared to the fixed pattern noise array. It is convenient, but not mandatory, that the points of the grid correspond to values of the fixed pattern noise array without interpolation.

The next step (66) involves identifying and selecting a region of interest (subarray) of the fixed pattern noise array to be compared to the grid. The subarray can be the same size, shape, and location (pixel coordinates) as the analysis region. For example, the analysis region and subarray can be matching sparsely populated areas within the image and array. The subarray can be a different size than the grid, or at a different location, or both. The subarray can be most of or the entire reference array.

In determining grid and reference array sizes, more data points tend to improve accuracy, but increase processing requirements. A relatively larger reference array provides more area to accommodate offset of the grid relative to the coordinates of the reference image, but again increases processing requirements. It is currently preferred that the grid and reference array each represent thousands of pixels. It is also currently preferred that the subarray be the same size or larger than the grid.

The reference arrays can be stored in compressed form in the respective reference models. This saves space, but adds decompression time to the overall process. Faster extraction for subarrays can be provided by storing reference arrays in a file format that allows regions or tiles to be extracted as needed. The subarrays, in this case, would be smaller than respective arrays. An example of a compression-decompression format suitable for this purpose is JPEG2000.

The similarity measure can take a variety of forms and can be based, for example on pattern matching, neural network, or basis vector (principal component analysis) approaches. Currently preferred is use of a neighborhood operator for cross-correlation, cross-covariance, or matched filtering. The computing of the similarity measure is described herein in relation to the spatial domain. It will be understood that comparable operations can be provided in the frequency domain.

The grid and array are compared using a statistical similarity measure, computed in step 68. The comparison of the grid and the array can be performed in the spatial domain or the frequency domain. A high value of statistical similarity can be taken as an indication of the likelihood that the test image came from the reference acquisition device under test.

One such statistical measure of similarity is the cross-covariance. One way to compute this is as follows.

1. Starting with two arrays, $e_{pq}$ and $f_{pq}$, the grid and subarray, respectively, the average array signal value is subtracted from each pixel value, $$e'_{p,q} = e_{p,q} - \bar{e}$$

$$f'_{p,q} = f_{p,q} - \bar{f}$$

where, $$\bar{e} = \frac{1}{PQ} \sum_{p=1}^{P} \sum_{q=1}^{Q} e_{p,q}$$

$$\bar{f} = \frac{1}{PQ} \sum_{p=1}^{P} \sum_{q=1}^{Q} f_{p,q}$$

2. The two modified arrays are then multiplied, pixel by pixel to form a combined array, while shifting (translating) one array with respect to the other, $$C_{l,m} = \sum_{p=1}^{P} \sum_{q=1}^{Q} e'_{p,q} f'_{p-l,q-m} \quad (4)$$

where the calculation in Equation (4) is done for each value of translation shift, l, m. This second modified array is modified by dividing by the number of image pixel values minus one, $$Cov_{l,m} = \frac{C_{l,m}}{PQ - 1} \quad (5)$$

This cross-covariance array has a maximum corresponding to relative location of maximum correspondence between e and f arrays. An example cross-covariance array is shown in FIG. 7.

A measure of the similarity of the two fixed-pattern arrays can be obtained by the estimation of the fraction of variance explained by similarity. This is found by dividing the maximum value of the cross-covariance array by the sample standard deviation of each original data array, e and f. The similarity measure, $\epsilon$, is computed as, $$\varepsilon = \frac{\text{Max}(Cov_{l,m})}{\sigma_f \sigma_e}$$

where the two standard deviation values are computed by, $$\sigma_f = \sqrt{\frac{\sum_{p=1}^{P} \sum_{q=1}^{Q} (f_{pq} - \bar{f})^2}{PQ - 1}}, \sigma_s = \sqrt{\frac{\sum_{p=1}^{P} \sum_{q=1}^{Q} (e_{pq} - \bar{e})^2}{PQ - 1}}$$

The similarity measure computation is repeated for the respective fixed pattern noise arrays of each of the reference models to be compared. The same computations can be repeated for each color record. The combinations which result in high values of the similarity measure are taken as having a higher probability of matching.

Computations can also be made using fixed pattern noise arrays for other test parameters. Results can be considered separately for the different test parameters or can be considered in combination.

The grid and subarray can also be inspected visually for corresponding features. To make this easier, the data sets can be adjusted to have the same average lightness and contrast when viewed on a computer monitor or digital print. The visual inspection provides an additional analysis, which can be used following computation of the similarity measure to provide an additional confirmation of the similarity measure. Another benefit of the visual inspection procedure is that it can be easily understood by a lay person. This may prove helpful in explaining the meaning of the similarity measure in court testimony.

EXAMPLE

The method was applied to the identification of which of several test scenes was generated by particular test camera. The fixed pattern noise array was computed using Equation (1) from a series of five replicate images of a grey uniform card. Four replicates of each of two sets of similar outdoor scenes where acquired for each of four cameras. The following similarity measures were calculated, as described above, for analysis regions chosen in the sky areas of each test image. Table 1 summarizes the results. The cameras are labelled A, B, C, and D.

TABLE 1

| Camera | Scene | Similarity ϵ red | Similarity ϵ green | Similarity ϵ blue |
| --- | --- | --- | --- | --- |
| A | 1 | 0.219 | 0.174 | 0.231 |
| A | 2 | 0.197 | 0.185 | 0.226 |
| B | 1 | 0.680 | 0.696 | 0.624 |
| B | 2 | 0.632 | 0.640 | 0.551 |
| C | 1 | 0.313 | 0.242 | 0.255 |
| C | 2 | 0.335 | 0.233 | 0.285 |
| D | 1 | 0.211 | 0.200 | 0.183 |
| D | 2 | 0.183 | 0.153 | 0.181 |

The correct camera, Camera B, was selected for both scenes, as shown by the values indicated in bold in Table 1.

Another embodiment of the method calls for matching the mean and standard deviation of the signal fluctuations for each of the grid and the subarray. If one of the grid and the subarray is e and the other is f then:

$\bar{e}$ = sample mean of e
$\bar{f}$ = sample mean of f
$s_e$ = sample standard deviation of e
$s_f$ = sample standard deviation of f the transformation is, $$f'_{pq} = (f_{pq} - \bar{f}) \frac{s_e}{s_f} + \bar{e}$$

Figure 6A:
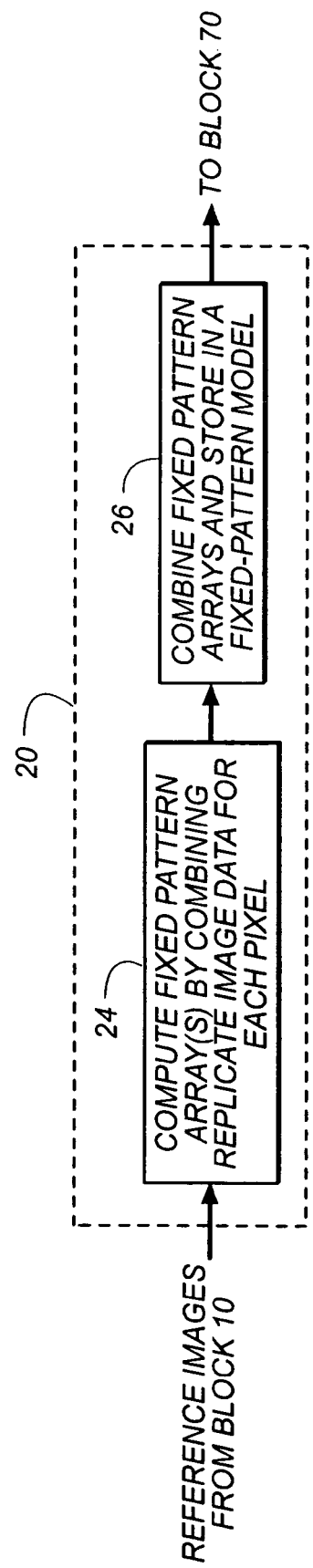
FIGS. 6A-6C are detailed partial elaborations of the flow chart of FIG. 4.
Figure 6B:
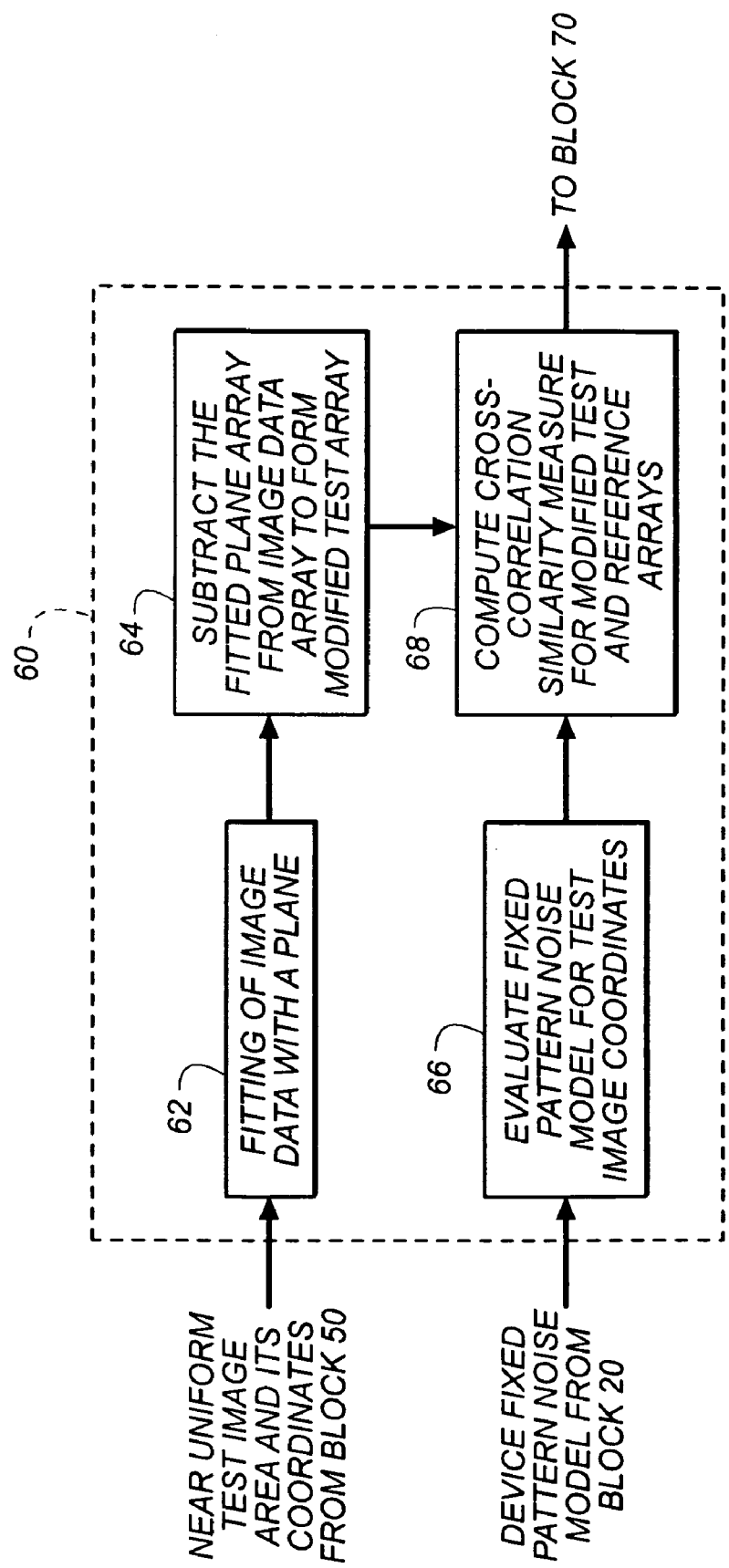
Figure 6C:
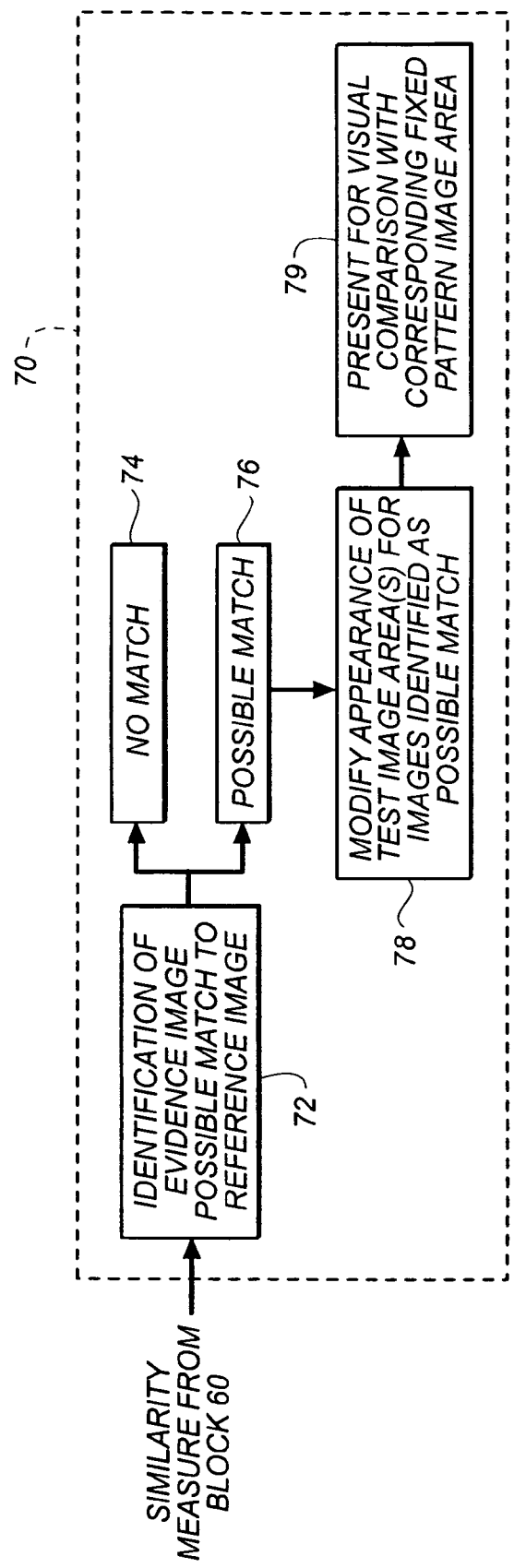

This is done in (78) of FIG. 6A. Since this is a global operation, applied to all data in f, it does not change the relative image noise fluctuations on which the image device identification is based, and in particular the similarity measure ϵ, is based.

The extent of testing required to obtain high values for the similarity measure of an unknown acquisition device can be reduced by first categorizing the unknown device and then limiting reference models to that category. This categorization is trivial, if the type of acquisition device is known or suspected. If the type of acquisition device is completely unknown, then this categorization can be provided by one or more additional identification or matching procedures. Those procedures can provide results that are used only to aid in the categorization or, alternatively, the results can be used in combination with the similarity measure to further characterize the test acquisition device.

Figure 9:
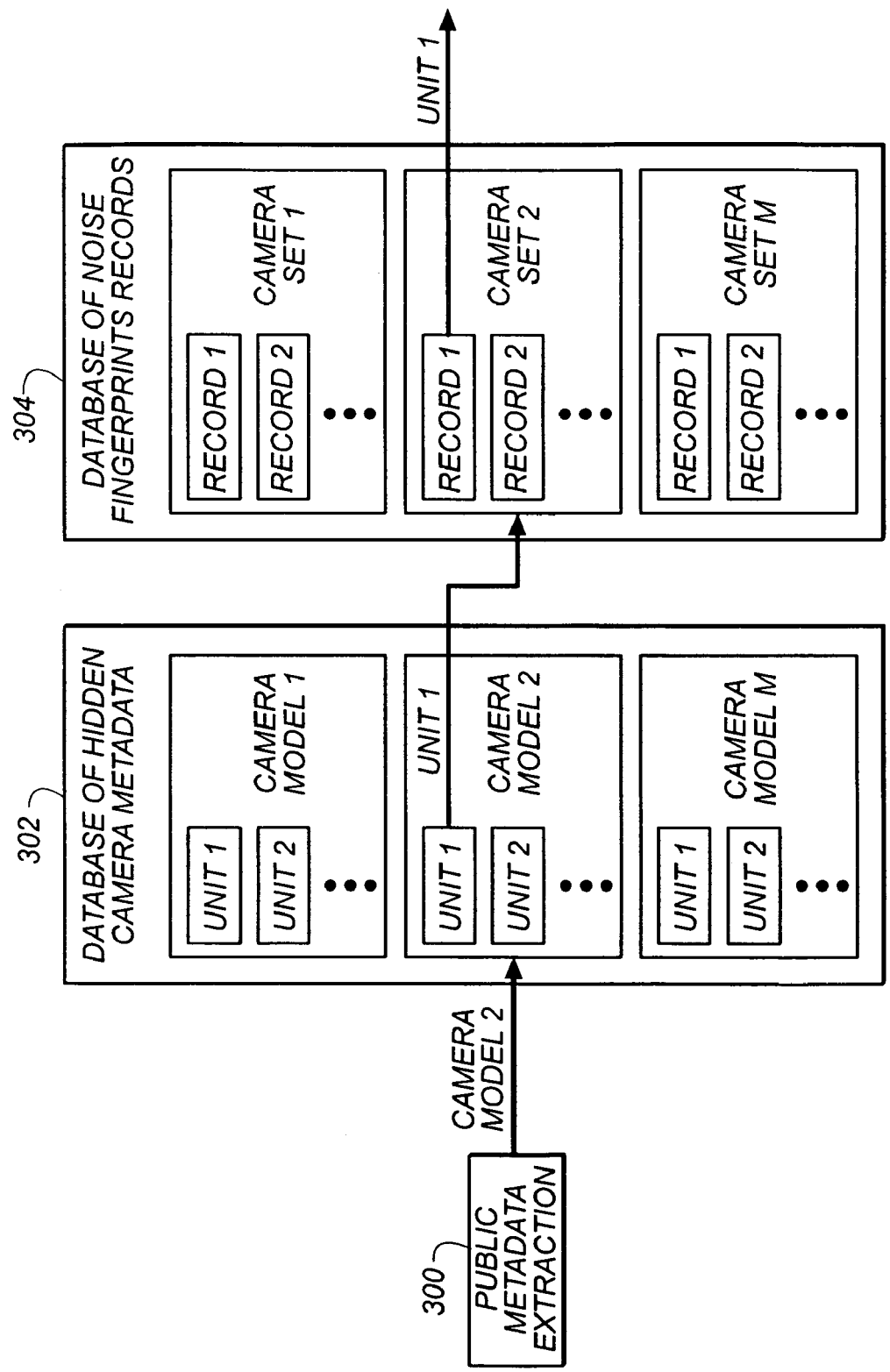
FIG. 9 is a diagrammatical view of another embodiment of the system.

Referring now to FIG. 9, in particular embodiments metadata identifiers are evaluated as a part of the matching procedure. Metadata is auxiliary information that is included within a digital image file as a header or is otherwise associated with the image file. At this time, provision of metadata with digital image files is a very widely accepted practice, however; metadata is not universally present in image files. It is possible to both capture digital images without providing metadata and to strip metadata out of existing image files. In the methods herein, if no metadata is found, then the metadata related procedures are terminated. A message to that effect can be provided to the user.

Metadata is widely used to provide those who use digital images with additional information, such as day and date, and comments, in an image file or otherwise in association with captured digital images. (Unless otherwise indicated, the location of the metadata relative to corresponding image data is not critical to the discussion here, which, for convenience, is generally in terms of metadata within a header of an image file. It is noted that metadata provided in a separate file has an inherently greater risk of disassociation than metadata provided within an image file.) Metadata has also been used or proposed that indicates camera model and, in some cases, serial number. In the above-described methods, a metadata camera identifier can be read and that information can be used to select a particular reference model, which then supplies a fixed pattern noise array for a test parameter. This can rapidly provide a similarity measure as to the reference acquisition device associated with the reference model. In FIG. 9, public metadata is extracted (300) from the test digital file, which indicates that the test image file is from Camera Model 2. Hidden metadata can then be located and checked against a database 302. The resulting information can be used in accessing a database 304 of reference models ("fingerprints") of different cameras.

The metadata just discussed can be described as public metadata. Information on the nature of this metadata and how it is recorded in image files is publicly available. The metadata is generally provided in a standard code, such as ASCII code and is not encrypted. The metadata is accessible to users having a relatively low level of computer knowledge and skill. It must be considered, in relying upon such public metadata in an image file, that original information could have been replaced by false information. This largely negates the usefulness of public metadata for identification of images from an unknown source.

It has been determined that there is another category of widely used metadata in image files, hidden metadata. This is metadata that is not provided for the user, but rather for someone else in the imaging chain. Hidden metadata is not publicly disclosed and is not accessible in the same manner as public metadata within the same image file. Hidden metadata can be encrypted and/or buried within other data in the image file.

For most digital cameras consistent color is an important characteristic. Manufacturing variability requires that each unit be calibrated to reduce the effect of variations in spectral sensitivity of different color channels. The variability is typically due to differences in transmissive characteristics of different colored filters positioned over the imager and manufacturing differences, such as coating irregularities, when imager-filters are manufactured. For convenience, the following discussion is generally directed to imagers having integral sRBG (red, blue, green) filters, however; this kind of color variability is not limited to a particular type of imager. For example, color variability of this type is seen in acquisition devices with imagers having integral filters having different colors or more than three colors; with multiple, independently filtered imagers; and with image acquisition devices having multiple, superimposed capture layers.

The variations in spectral sensitivity of different color channels are corrected by a white balancing operation that is performed in the acquisition device following capture of an image. The calibration data developed at the time of manufacture provides the necessary information to simulate equivalent transmissive channels for the image sensor. The balanced channels can then detect the spectrum of the captured image and create consistent color. For an sRGB imager, the white point balance calibration data is a triplet of values for the red, green and blue channels. In the calibration operation, the calibration data is used in a color balancing function to correct initial pixel values from the imager. (In the discussion of the embodiments disclosed in detail herein, the terms "white point balance calibration data" and "calibration data" are used as equivalents. "Calibration data" used in relation to the invention generally, refers to any hidden metadata placed in a digital image file and used to accommodate and track variability in acquisition device components. The terms "digital image file" or "image file" and "digital image" are equivalent.) Color balancing functions are well known, for example, the calibration data can be a multiplier or an additive correction for the pixel values from the imager. The calibration data can be stored separately from the acquisition device, but this is cumbersome; therefore, the calibration data is typically recorded in firmware of the acquisition device.

The white point balance calibration data can be provided, as metadata within each image file. It is believed that the provision of the calibration data as hidden metadata in image files is very common in currently marketed digital cameras. (An exception is very inexpensive, "toy" digital cameras, which are unlikely to provide a white point balance calibration.) A review of published metadata and image file format specifications and standards did not locate any description of white point balance calibration data elements. On the other hand, it is known that calibration data is provided as hidden metadata in many currently marketed digital cameras.

It is believed that, in all cases, a primary reason for the provision of the calibration data as hidden metadata in image files is to aid the manufacturer's quality control. Calibration data is useful in the camera manufacturer's analysis of color consistency problems that can arise when the assembly process is not in calibration. It is very convenient to access calibration data during manufacture, by a simple and standard procedure: capturing and downloading an image. This contrasts with the difficulty of extracting calibration data from the firmware of a completed camera. The white point balance calibration data is usable in the same manner in digital image acquisition devices other than cameras. For convenience, the following discussion is generally limited to cameras. Like considerations apply to other acquisition devices.

It has been determined that white point balance calibration data has a relatively high degree of uniqueness for a individual imager. This allows a relatively high probability of identifying a particular acquisition device. The calibration data can also be used to quickly categorize a particular acquisition device. For example, it has been determined that some different types of cameras have different numbers of bits in the calibration data. The number of bits can be used to categorize a test camera for the selection of reference models.

The term "white point balance calibration data" is inclusive of like calibrations in equivalents of "color" spaces for other types of imagery, for example, calibration of a multiple channel infrared or ultraviolet imager. Different "colors" are to be understood as designating different, and not necessarily visible, subbands of electromagnetic radiation.

White point balance calibration data is typically stored in a file location in the image file that is unique to a particular camera type, but is not publicly defined. In preparing the calibration data, the calibration value for the most transmissive channel of the imager (for example, green in a typical sRGB imager) is normalized to 1.0 or some other predetermined value and this normalized value is expressed as an n bit fixed-point integer with n bits of fractional data.

The calibration values for the other channels are then proportionately adjusted relative to the most transmissive channel. The calibration values for the other channels are included within the calibration data. The calibration value for the most transmissive channel may or may not be included in the calibration data. Non-inclusion saves space, but takes the risk that the predetermined normalized value of the most transmissive channel will be ambiguous when the calibration data is used.

In the matching process, test calibration data, that is, the white point balance calibration data for a test image, is compared to one or more sets of reference calibration data, that is, the calibration data of one or more reference acquisition devices. If the test calibration data and one or the sets of reference calibration data match, then there is a high probability that the test image is from the corresponding reference acquisition device. The probability of matching is dependent upon a number of factors, including the accuracy of the original calibration and the precision of the calibration data.

The reference calibration data can be retrieved from the firmware of the acquisition device, or taken from a previously prepared database of calibration data. The former approach is cumbersome. The database is unlikely to be available, except in limited circumstances for limited numbers of acquisition devices.

A more generally useful alternative is retrieval of the reference calibration data from a reference image file using knowledge of the characteristics (i.e. number of bits) of the calibration data and its file location in the image file. Information on the characteristics and location could be provided by a manufacturer or could be based upon previous efforts with acquisition devices of the same type. The retrieved information can be used to match an image to an available camera, to match two images from the same unavailable camera, or to match an image to a particular configuration of camera. The file location may vary, particularly with rerecording of image files, but even in that case, the calibration data is likely to remain in the vicinity of the file location. This limits the time required for searching. The "configuration" relates to the characteristics and location of the calibration data within the image files produced by the camera and is likely to be relatively constant for a given manufacturer of a particular acquisition device or of the capture components of a particular acquisition device. The knowledge of the characteristics and location of the calibration data can be obtained from a previously prepared database or can be determined at time of testing. One of the characteristics can be required encryption-deencryption procedures for the calibration data.

The "reference image" and "test image" are subject to the same broad constraints as earlier discussed in relation to the noise based identification of images. In the embodiments disclosed in detail herein, the provenance of the test image is unknown and the reference images known.

Detection and retrieval of the calibration data without foreknowledge of the characteristics and location of the calibration data within an image file allows matching of an image to an available camera, matching of two images as being from the same unavailable camera, or matching of an image to a particular configuration of camera. The detection of calibration data within image files relies upon the constancy of that data, relative to other metadata and information within the images files from a single acquisition device and the variability of calibration data from acquisition device to acquisition device. The available image files and, if in some cases, acquisition device are first examined to determine public metadata and other information, such as the number of color channels. Available information is then consulted and search criteria are defined within the limits of the known information. For example, it might be known that a particular camera manufacturer uses calibration data having 16 bit values.

The search of the image files for elements that could represent the calibration data, can be conducted manually or by an automated process. The automatic process can include, but is not limited to, one or more of the following: signature analysis, frequency evaluation associated with value/location, data normalization, and adjacency analysis.

The results of the search can be analyzed to give a probability that a test image file is from a particular reference camera. This can take into account the accuracy and precision of the initial assignment of particular calibration data.

Figure 10:
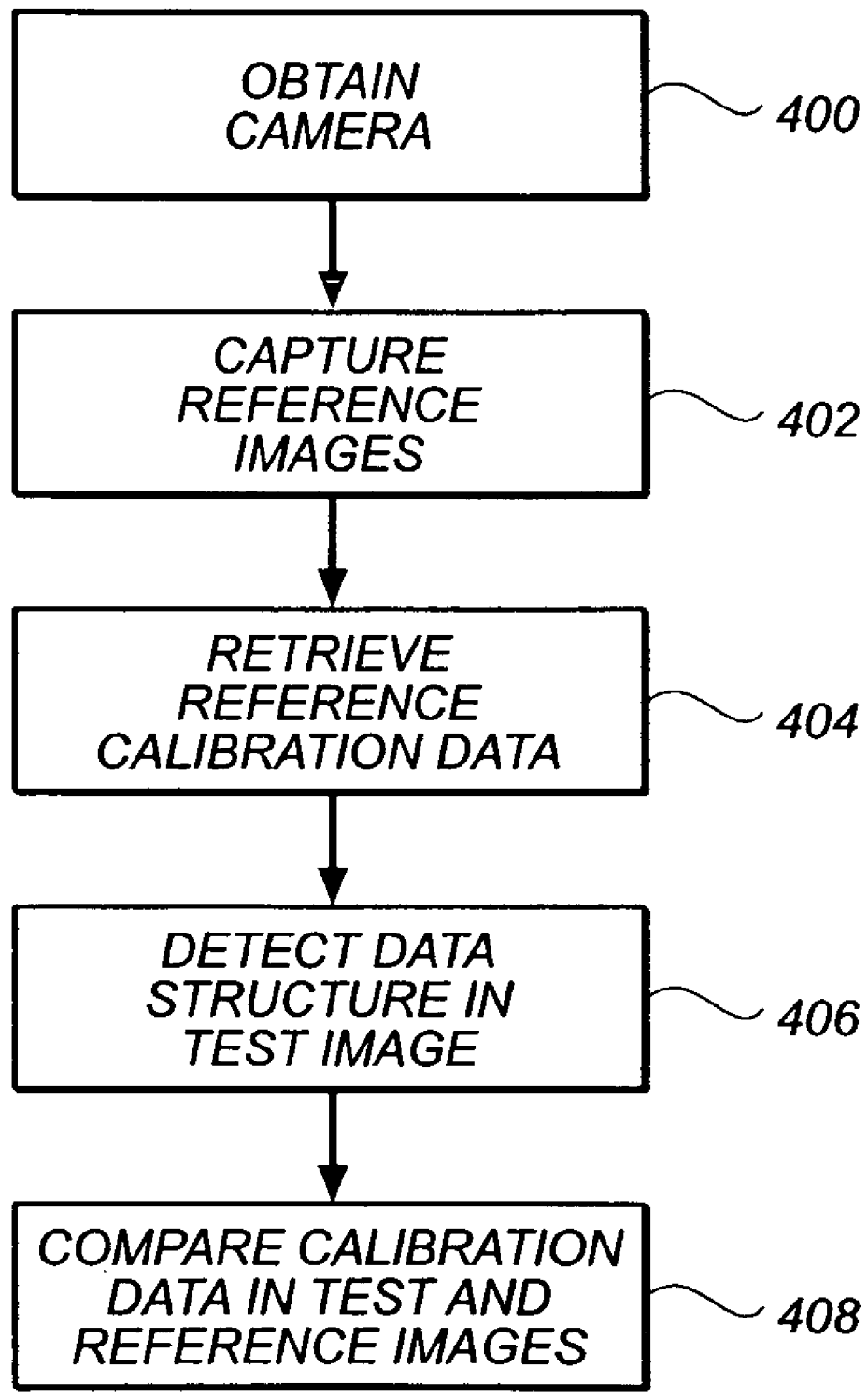
FIG. 10 is a flow chart of the matching process that utilizes calibration data.

Referring to FIG. 10, in a particular embodiment, the matching process detects and then utilizes the white point balance calibration data to match reference image files from an available camera or the like to a test image file. A reference camera is obtained (400), reference images are captured (402), and reference calibration data is retrieved (404). A determination (406) is made as to whether the primary data structure that stores metadata elements is present in the test image file. If the primary data structure is present, then the process continues and calibration data in the test image is compared (408) to the reference calibration data. If the primary data structure is not present or lacks content that could represent the calibration data, then the process terminates. (Likewise, reference image files are not usable in this process if the data structure is absent.)

The calibration data and other metadata can utilize any encoding scheme that provides a means to identify an element of information, associated attributes, and content. Two examples are Tiff defined tags utilized in the Exif (Exchangeable image file format for Digital Still Cameras) image file format and XML elements utilized in the JPEG 2000 ISO standard.

Public metadata and other publicly available information is then reviewed to delimit the search for the calibration data. This step can partially localize the calibration data by narrowing the search to particular areas of the image file or change the priorities of searching different areas. This step can also fully or partially define the characteristics of the calibration data. The characteristics include, but are not limited to: number of channels, bit depth, and normalization value. For example, with an available reference camera, the type of image sensor is known or easily determined and the number of channels can be easily derived from that information.

Public metadata stored in the image file can be analyzed to determine if the metadata has any special syntax or format that is likely to represent how each element of the white point balance calibration data is stored. Two methods utilized in Exif files to store private metadata within a defined tag involve the use of Image File Directory (IFD) that stores private metadata elements and storage of the private metadata elements as a collection of binary data elements.

Within an image file there are core container data structures that holds the metadata elements and their associated values. The metadata elements and associated data can be used to map the locations used within the core container data structure. Unused locations within the core container data structure will be a focus point for searching. The core container data structure used within the Exif image file format specification is known as the Application Segment. Within the JPEG 2000 image file format specification, the core container data structure is known as a "Box".

Public metadata can define the camera type and provide other information, but, as discussed above, is also subject to the limitation that the detected values may be fakes. On the other hand, the determination as to whether or not this is the case may itself be valuable information.

Once the camera type is known, from an available camera or public metadata, reference literature or the like can be consulted to determine the type of image sensor used in the camera. Based upon the image sensor used, the number of channels incorporated in the camera system is apparent. Each channel must be calibrated to manage the transmissive differences so that consistent color can be achieved. The most transmissive channel, which is also likely to be known, is likely to be normalized to 1.0 or another fixed value. Each channel supported by the image sensor will have a value that is represented by n bits. Typically the value of n is between 8 and 32 bits. The most transmissive channel value is very likely to be consistent for all the image files created by this particular camera type. (The camera type is likely to be marketed under a constant model designation, although this may not be the case.)

Next, a search is conducted for the calibration values for the most transmissive channel. The normalization value for the most transmissive channel is likely to be the same in different cameras of the same type. This is more convenient for the manufacturer than changing normalization values. The location in the image files where the calibration value for the most transmissive channel is stored is also likely to be consistent for the same reason. Exceptions can occur when data structures are added to an image file that has been resaved, but this exception can be excluded, if the search can be conducted using first generation images from an available camera.

Once the value, size and location of the calibration value of the most transmissive channel are determined, the search is expanded around that location to detect the calibration values of the other channels. Image files from the same camera should have consistent values for all the calibration values that comprise the white point balance calibration data. The location and values of this consistent data are recorded. If the most transmissive channel calibration value is not detected as being recorded in the image file, then the search is repeated at the same locations to detect the calibration values of the other channels.

The values of the calibration data for the reference images from the first reference camera are then compared to values at the same locations from a plurality of other reference cameras of the same type. The location of the calibration values should be consistent from camera to camera, but the elements that comprise the white point balance calibration data should be different for each camera.

In another embodiment, pattern recognition is utilized to search for calibration data in an sRGB image file. In this embodiment, the pattern recognition takes into account the following expected properties of the calibration data:

The green channel is expected to have a consistent value.

The green channel value is expected to be normalized to 1 or to a value of approximately 50% of the maximum value stipulated by the size or number of bits in one of the elements of the white point balance calibration data.

The normalized green channel value may or may not be stored in the image file.

The size, in number of bits, of each element (calibration value) of the white point balance calibration data is expected to be between 8 and 32 bits.

Data encoding required for an applicable standard is expected to correctly interpret the calibration values. For example, the data encoding method used within Exif to support the encoding of multi-byte values is the Byte Order field within the TIFF Header.

Available information as to locations and characteristics of the calibration data is expected to be applicable.

The pattern recognition determines if the white point balance calibration data is detected and records the locations and values. The pattern recognition also indicates if multiple test images are all from the same or from different cameras.

EXAMPLE: Matching Test Images to Camera Type and Identifying Whether the Same Camera Captured all of Test Images Four different test images (hereafter referred to as Files 1-4) were obtained, without knowledge of the digital acquisition device used to produce the images. The test images were identified as sample DC 215 Exif digital camera image files captured using a DC 215 digital camera, which was marketed by Eastman Kodak Company of Rochester, N.Y.

Public information was reviewed in relation to the type of camera and reference images were obtained from three different cameras of the same type (all were Model DC 215 digital cameras). A DC 215 camera has an RGB sensor and red, green and blue channels. A primary data structure that stores metadata elements is specified for the images produced by the DC 215 and the positions of various values are defined.

The primary data structures were found in the reference images. The data features designated Make, Model, Orientation, Xresolution, Yresolution, ResolutionUnit and ExifVersion tags were consistently populated. The DateTimeOriginal, that indicates when the image file was captured had different dates and times. The Make tag was set to "Eastman Kodak Company" and the Model tag was set to "DC210 Zoom (V05.00)".

A search was conducted on the reference images from the different reference cameras. The search revealed that within the MakerNote tag data at a zero based offset in the image files of 0x2F8 a 4-byte field consisting of 0x00, 0x01, 0x00, 0x00 was consistently found in all of the cameras. This field was consistent with a 32 bit value. This value, normalized to 1.0, was consistent with a 16 bit fixed-point integer with 16 bits of fractional data. It was concluded that this field represented the green channel calibration value.

The test images were next examined. The primary data structure was found to be present along with public metadata, as shown in Table 2.

TABLE 2

| | | Metadata Values for the Test Image Files | | | |
|---|---|---|---|---|---|
| Tag Name | Tag ID | File 1 | File 2 | File 3 | File 4 |
| Make | 271 | Eastman Kodak Company | Eastman Kodak Company | Eastman Kodak Company | Eastman Kodak Company |
| Model | 272 | DC210 Zoom (V05.00) | DC210 Zoom (V05.00) | DC210 Zoom (V05.00) | DC210 Zoom (V05.00) |
| Orientation | 274 | 1 | 1 | 1 | 1 |
| Xresolution | 282 | "216/1" | "216/1" | "216/1" | "216/1" |
| Yresolution | 283 | "216/1" | "216/1" | "216/1" | "216/1" |
| ResolutionUnit | 296 | 2 | 2 | 2 | 2 |
| ExifVersion | 36864 | 110 | 110 | 110 | 110 |
| DateTimeOriginal | 36867 | 1999:08:21 15:47:59 | 1999:08:21 21:29:11 | 1999:08:24 14:30:53 | 1999:08:21 15:32:26 |

The analysis of the details associated with the metadata elements stored in the core container data structure, APP1 the Exif Application Segment, revealed the following conclusions for the four image files analyzed:

The DateTimeOriginal tag that indicates the date and times the image files had been captured, reveal that the images had been capture at different times on Aug. 21st and 24th in 1999.

The Make and Model tags that indicate the manufacture and model name of the camera had the same information.

The XResolution, Yresolution, and ResolutionUnit tags that indicates the pixels per inch, had the same information.

The Orientation Tag, that indicates that the primary image is a raster JPEG image, had the same information The ExifVersion tag has the same value that indicates Exif version 1.1

Calibration data was detected in all four of the test image files. Pattern recognition revealed that within the MakerNote tag, Tag ID 37500, the following binary pattern was detected in all 4 files: 0x00, 0x01, 0xE9, 0xC4, 0x00, 0x01, 0x00, 0x00, 0x00, 0x01, 0xE1, 0x68. This data represented the three elements of the white point balance calibration data as follows:

The green channel, the most transmissive, had a value of 0x00, 0x01, 0x00, 0x00, the same as the reference cameras.

One of the red and blue channels had a value of 0x00, 0x01, 0xE9, 0xC4.

The other of the red and blue channels had a value of 0x00, 0x01, 0xE1, 0x68.

This matching of the calibration data provided a strong indication that the same DC 215 type camera captured all of the test images. The public metadata values reported in Table 1 indicate that the camera captured the image files at different dates and times.

It was noted that two of the image files were original camera files (Files 1-2) and two had been uncompressed and saved with the metadata elements persisted (Files 3-4). In Files 1-2, the detected pattern was located in the image files at a zero-based offset of 0x2F4 through 0x2FF. In Files 3-4, the detected pattern was located in the image files at a zero-based offset of 0x306 through 0x311. The location difference between the original camera files and those uncompressed and resaved is associated with the insertion of a JFIF application segment that adds 0x12 or 18 bytes of data after the start of image marker.

The invention has been described in detail with particular reference to certain preferred embodiments thereof, but it will be understood that variations and modifications can be effected within the spirit and scope of the invention.

The invention claimed is:

1. A method executable by a computer for identifying a digital acquisition device that captures an image using red, green, and blue channels, the method comprising the steps of:

obtaining at least a makernote tag data containing a first non-public whitepoint calibration data of a suspected digital acquisition device with the computer;

locating a makernote tag data in an image file to be matched with the computer;

searching for a second non-public whitepoint calibration data within the makernote tag data located in the image file to be matched with the computer;

comparing the first non-public whitepoint calibration data with the second non-public whitepoint calibration data with the computer; and identifying the suspected digital acquisition device as a source of the test image file if the first and second non-public whitepoint calibration data match with the computer, wherein each of the first and second non-public whitepoint calibration data contains a calibration value of the green channel, a calibration value of the red channel, and a calibration value of the blue channel, wherein the searching step includes:

detecting a pattern of the green channel calibration value, the red channel calibration value, and the blue channel calibration value contained in the image file to be matched; and first detecting the calibration value of the most transmissive channel among the green, red, and blue channels, and then expanding around a location of the detected most transmissive channel to detect the calibration values of other channels among the green, read, and blue channels.

2. A computer-readable storage medium storing a computer program executable by a computer for identifying a digital acquisition device that captures an image using red, green, and blue channels, the computer program containing:

an obtaining code for obtaining at least a makernote tag data containing a first non-public whitepoint calibration data of a suspected digital acquisition device;

a locating code for locating a makernote tag data in an image file to be matched;

a searching code for searching for a second non-public whitepoint calibration data within the makernote tag data located in the image file to be matched;

a comparing code for comparing the first non-public whitepoint calibration data with the second non-public whitepoint calibration data; and an identifying code for identifying the suspected digital acquisition device as a source of the test image file if the first and second non-public whitepoint calibration data match, wherein each of the first and second non-public whitepoint calibration data contains a calibration value of the green channel, a calibration value of the red channel, and a calibration value of the blue channel, wherein the searching code is further configured to:

detect a pattern of the green channel calibration value, the red channel calibration value, and the blue channel calibration value contained in the image file to be matched; and first detect the calibration value of the most transmissive channel among the green, red, and blue channels, and then expand around a location of the detected most transmissive channel to detect the calibration values of other channels among the green, read, and blue channels.

* * * * *

UNITED STATES PATENT AND TRADEMARK OFFICE
CERTIFICATE OF CORRECTION

PATENT NO. : 7,609,846 B2  Page 1 of 1
APPLICATION NO. : 10/890016
DATED : October 27, 2009
INVENTOR(S) : Craig M. Smith et al.

It is certified that error appears in the above-identified patent and that said Letters Patent is hereby corrected as shown below:

| Issued Patent Column | Line | Description of Error |
|---|---|---|
| 20 | 10 (Approx.) | In Claim 1, delete "read," and insert -- red, --, therefor. |
| 20 | 45 (Approx.) | In Claim 2, delete "read," and insert -- red, --, therefor. |

Signed and Sealed this

Ninth Day of February, 2010

David J. Kappos
*Director of the United States Patent and Trademark Office*